United States Patent
Glennon

(10) Patent No.: US 8,654,316 B1
(45) Date of Patent: Feb. 18, 2014

(54) METHODS AND SYSTEMS FOR TARGET DETECTION

(75) Inventor: John J. Glennon, Boulder, CO (US)

(73) Assignee: Lockheed Martin Coherent Technologies, Inc., Louisville, CO (US)

(*) Notice: Subject to any disclaimer, the term of this patent is extended or adjusted under 35 U.S.C. 154(b) by 242 days.

(21) Appl. No.: 13/030,093

(22) Filed: Feb. 17, 2011

(51) Int. Cl.
  *G01S 17/36* (2006.01)
(52) U.S. Cl.
  USPC .......................................................... 356/5.1
(58) Field of Classification Search
  USPC .......................................................... 356/5.1
  See application file for complete search history.

(56) References Cited

U.S. PATENT DOCUMENTS

| | | | |
|---|---|---|---|
| 5,194,906 A * | 3/1993 | Kimura et al. | 356/5.11 |
| 7,557,929 B2 * | 7/2009 | Fang-Yen et al. | 356/484 |
| 7,826,039 B2 * | 11/2010 | Hinderling | 356/4.01 |
| 8,078,420 B2 * | 12/2011 | Miller | 702/82 |
| 2002/0180956 A1 * | 12/2002 | Barker | 356/121 |
| 2008/0239281 A1 * | 10/2008 | Bridges | 356/5.09 |
| 2009/0065583 A1 * | 3/2009 | McGrew | 235/454 |

OTHER PUBLICATIONS

George M. Williams Jr., et al., "Optically Coded Nanocrystal Taggants and Optical Frequency IDs", Proc. SPIE 7673, 76730M (Apr. 2010).

* cited by examiner

*Primary Examiner* — Isam Alsomiri
*Assistant Examiner* — Vicente Rodriguez
(74) *Attorney, Agent, or Firm* — McDermott Will & Emery LLP

(57) ABSTRACT

Various aspects of the disclosure provide a target system that is small and low power. In one embodiment, the target system transmits an intensity modulated light beam to a target (which may be tagged with a fluorescent taggant), collects the resulting return light from the target, and separates out elastic light scatter and fluorescent light in the collected light. The intensities of the elastic light scatter and the fluorescent light are then separately detected by first and second photodetectors, respectively. The first photodetector generates an elastic scatter detection signal based on the detected elastic light scatter and the second photodetector generates a fluorescent detection signal based on the detected fluorescent light. The elastic scatter detection signal and/or the fluorescent detection signal are used to provide one or more of the following functions: 1) target detection, 2) range determination, 3) taggant detection, and 4) taggant discrimination/confirmation.

17 Claims, 4 Drawing Sheets

METHODS AND SYSTEMS FOR TARGET DETECTION

STATEMENT REGARDING FEDERALLY SPONSORED RESEARCH OR DEVELOPMENT

Not applicable.

FIELD

The present invention generally relates to target detection and, in particular, relates to detection of a target marked with a taggant.

BACKGROUND

Fluorescent taggants can be used to mark and track targets, e.g., in a military setting or other setting. The taggant may comprise a material that fluoresces when illuminated by a target system. A target of interest may be marked (tagged) with a taggant by dispersing the taggant in the vicinity of the target using an explosive detonation or projectile, thereby coating the target with the taggant. There are, of course, other ways to tag a target.

Current systems for detecting and tracking targets marked with a taggant are often large, bulky and incorporate an active light source having large peak powers that are unsafe for humans. While these systems can have operating ranges that reach beyond a kilometer, they are too large, heavy and consume too much power to be carried and operated by an individual (e.g., a soldier).

SUMMARY OF THE INVENTION

Various aspects of the disclosure provide a target system that is small and low power enough to be carried and operated by an individual.

In one embodiment, the target system comprises a low power continuous wave (cw) light source, front-end optics, an optical filter, and first and second photodetectors. The light source generates a light beam that is intensity modulated at a modulation frequency (e.g., 1 MHz). The front-end optics direct the light beam to a target (which may be tagged with a fluorescent taggant), collects the resulting return light from the target, and directs the return light to the optical filter, which separates out elastic light scatter and fluorescent light in the collected light. The intensities of the elastic light scatter and the fluorescent light are then separately detected by the first and second photodetectors, respectively. The first photodetector generates an elastic scatter detection signal based on the detected elastic light scatter and the second photodetector generates a fluorescent detection signal based on the detected fluorescent light.

In one embodiment, the target system computes an amplitude of the elastic scatter detection signal, and determines whether the target system is aligned with the target based on the amplitude.

In another embodiment, the target system computes a phase difference between the elastic scatter detection signal and a reference signal, and determines the range of the target based on the phase difference.

In still another embodiment, the target system computes an amplitude of the fluorescent detection signal, and determines whether a taggant is present on the target based on the amplitude.

In yet another embodiment, the target system computes a phase difference between the elastic scatter detection signal and the fluorescent detection signal, and determines a mean fluorescence lifetime based on the phase difference. The determined lifetime may be used to discriminate a taggant of interest having a well-defined fluorescence lifetime from other taggants having different lifetimes and/or a fluorescing background.

Thus, the target system according to various embodiments of the invention provides one or more of the following functions: 1) target detection, 2) range determination, 3) taggant detection, and 4) taggant discrimination/confirmation.

Additional features and advantages of the invention will be set forth in the description below, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

DETAILED DESCRIPTION

Figure 1:
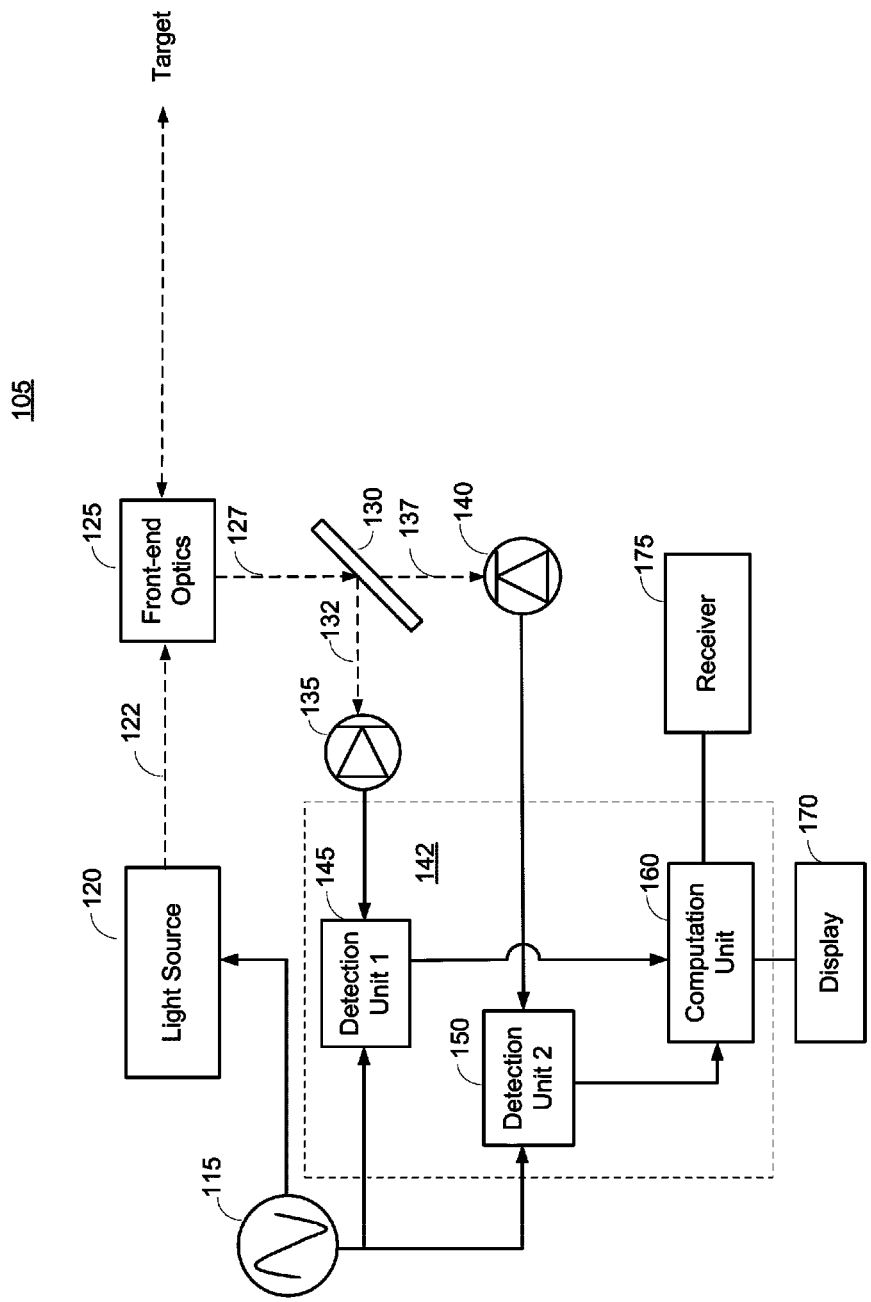
FIG. 1 is a conceptual diagram illustrating a target system according to an embodiment of the present invention.

FIG. 1 is a block diagram illustrating a target system 105 for detecting and tracking a target marked (tagged) with a fluorescent taggant according to an embodiment of the present invention. The taggant may comprise a fluorescent material that absorbs incoming light and reemits light at a different wavelength (e.g., longer wavelength). Various examples of taggant materials that may be used are discussed further below. A target of interest may be marked with a taggant by dispersing the taggant in the vicinity of the target using an explosive detonation or projectile. The target system 105 may be used to provide one or more of the following functions: 1) target detection, 2) range determination, 3) taggant detection, and 4) taggant discrimination/confirmation. Each of these functions is described in further detail below.

The target system 105 comprises a reference oscillator 115, a light source 120, front-end optics 125, an optical filter 130, a first photodetector 135, a second photodetector 140, a detection and computation subsystem 142, and a display 170. The detection and computation subsystem 142 further comprises a first detection unit 145, a second detection unit 150, and a computation unit 160. Each of the detection units 145 ad 150 may be implemented with a lock-in amplifier, as discussed further below. The computation unit 160 may be implemented with a microcontroller, a Digital Signal Processor (DSP), an Application Specific Integrated Circuit (ASIC), a Field Programmable Gate Array (FPGA), hard-wired logic, analog circuitry and/or any combination thereof. Each of the first and second photodetectors 135 and 140 may comprise a biased diode, a photomulplier tube (PMT) or other type of photodetector.

The light source 120 may be a laser (e.g., cw or quasi-cw laser), a light emitting diode (LED), a lamp or any other light source capable of producing light that can excite the fluorescent material of the taggant. In the remainder of the description, it will be assumed that the light source 120 is a laser, although it is to be understood that any suitable light source may be used.

In one embodiment, the intensity of the light source 120 is modulated at a frequency or harmonic of the frequency of the oscillator 115. As a result, the light source 120 outputs an intensity modulated light beam 122 having a modulation frequency equal to the frequency or harmonic frequency of the oscillator 115. The light beam 122 may be modulated as a sine wave or other suitable waveform.

The intensity modulated light beam 122 is coupled to the front-end optics 125, which directs the light beam 122 to a target. A portion of the light beam is reflected off of the target as elastic light scatter. The elastic light scatter may have approximately the same frequency as the light beam 122 and may comprise backscattered light. If a taggant is present on the target, then a portion of the light beam is absorbed by the taggant and reemitted at a different wavelength as fluorescent light. In this case, the return light, which includes both the elastic light scatter and fluorescent light, is collected optically by the front-end optics 125, which directs the collected light 127 to the optical filter 130. The optical filter 130 is used to separate out the elastic light scatter 132 and the fluorescent light 137 so that the intensity of each can be separately detected. Since the elastic light scatter 132 and the fluorescent light 137 have different wavelengths, the optical filter 130 can separate the two using wavelength filtering.

The optical filter 130 directs the elastic light scatter 132 to the first photodetector 135 and directs the fluorescent light 137 to the second photodetector 140. For example, the optical filter 130 may comprise a dichroic beamsplitter configured to reflect the elastic light scatter 132 to the first photodetector 135 and pass through the fluorescent light 137 to the second photodetector 140, as shown in FIG. 1.

The first photodetector 135 detects the intensity of the elastic light scatter 132. Since the light beam 122 is intensity modulated, the elastic light scatter 132 is also intensity modulated at the same frequency. However, the intensity modulation of the detected elastic light scatter 132 is phase shifted relative to the intensity modulation of the transmitted light beam 122. This phase shift is due to the delay between the time that the light beam 122 is transmitted from the light source 120 and time that the resulting elastic light scatter 132 is detected by the first photodetector 135. Since the transmitted light source 120 is modulated using the reference oscillator 115, and hence phase synchronized with the reference oscillator 115, this phase shift is equal to the phase difference between the detected elastic light scatter 132 and the reference oscillator 115. As discussed further below, this phase difference can be used to estimate the range of the target from the target system 105.

The first detection unit 145 receives the elastic scatter detection signal from the first photodetector 135, and determines both an amplitude of the elastic scatter detection signal and the phase angle difference between the elastic scatter detection signal and the reference oscillator 115. The first detection unit 145 provides the resulting elastic scatter amplitude and the phase angle difference to the computation unit 160.

The second photodetector 140 detects the intensity of the fluorescent light 137. The fluorescent light 137 is intensity modulated and phase shifted as long as the modulation frequency is slower than the fluorescent lifetime of the taggant material.

The second detection unit 150 receives the fluorescent detection signal from the second photodetector 140, and determines both the amplitude of the fluorescent detection signal and the phase angle difference between the fluorescent detection signal and the reference oscillator 115. The second detection unit 150 provides the resulting fluorescent amplitude and the phase angle difference to the computation unit 160.

In one embodiment, the computation unit 160 detects the target based on the elastic scatter amplitude from the first detection unit 145. For example, the computation unit 160 may detect the target when the elastic scatter amplitude is above a certain threshold. In this example, the elastic scatter amplitude may be averaged over a period of time. When the target has been detected, the computation unit 160 may display an indicator on the display 170 indicating that the target has been detected. After aiming the target system 105 at the target, the user may use the target detection to confirm that the target system 105 is aligned with the target.

The computation unit 160 may also determine the range of the target from the target system 105 based on the phase difference between the elastic scatter detection signal and the reference oscillator 115. For example, if the phase difference is about 180 degrees, then the sum of the distance that the light beam 122 travels to the target and the distance that the resulting elastic light scatter travels back to the target system 105 is equal to about half the modulation wavelength. In this example, the range of the target from the target system 105 is equal to about a quarter of the modulation wavelength. The modulation wavelength refers to the wavelength of the intensity modulation, which is a function of the modulation frequency. The modulation wavelength should not be confused with the wavelength of the light beam 122, which can be on the order of micrometers and nanometers for light in the ultraviolet, visible and infrared spectrums. After determining the range of the target, the computation unit 160 may display the range on the display 170.

The computation unit 160 may also detect the presence of the taggant on the target based on the fluorescent amplitude from the second detection unit 150. For example, the computation 160 may detect the presence of the taggant when the fluorescent amplitude is above a certain threshold. In this example, the fluorescent amplitude may be averaged over a period of time. When the presence of the taggant has been detected, the computation unit 160 may display an indicator on the display 170 indicating the presence of the taggant. This allows the user to confirm that the target is tagged.

The computation unit 160 may also determine the average fluorescent lifetime of the taggant on the target. To do this, the computation unit 160 may determine the phase difference between the elastic scatter detection signal and the fluorescent detection signal, which gives the average fluorescent lifetime of the taggant. The computation unit 160 may determine the phase difference between the elastic scatter and fluorescent detection signals based on the phase differences from the first and second detection units 145 and 150. Assuming that the taggant of interest has a known, well-defined lifetime, the computation unit 160 may confirm that the detected taggant is the taggant of interest when the determined average lifetime is close to the known lifetime of the taggant of interest. If the computation unit 160 determines that the detected taggant is the taggant of interest, then the computation unit 160 may display an indicator on the display 170 confirming that the detected taggant is the taggant of interest. Examples of taggants having well-defined lifetimes are provided below.

The computation unit 160 may use the determined average lifetime to discriminate between taggants having overlapping fluorescent spectra, but different lifetimes. The computation unit 160 may also use the determined average lifetime to determine whether the detected fluorescent light 137 is from the taggant of interest or interference from a fluorescing object. Thus, the determined average lifetime allows the target system 105 to collect the fluorescent light over a broad spectrum to increase signal-to-noise ratio (SNR) while discriminating a taggant of interest from other taggants having different lifetimes and interference from fluorescing objects (background fluorescence).

In one embodiment, the first detection unit 145 may comprise a lock-in amplifier, which is capable of sensitive phase measurements. In this aspect, the lock-in amplifier may receive the elastic scatter detection signal from the first photodetector 135 and a reference signal from the reference oscillator 115, which serves as a reference. The lock-in amplifier may then derive in-phase and quadrature components for the elastic scatter detection signal relative to the reference, and compute the phase difference between the elastic scatter detection signal and the reference based on the inverse tangent of the quadrature and in-phase components. The lock-in amplifier may also compute an amplitude for the elastic light scatter that is proportional to the average signal amplitude of the elastic scatter detection signal. The second detection unit 150 may also comprise a lock-in amplifier similar to the first detection unit 145.

In one aspect, the modulation frequency may determine both the range limit and the range resolution of the target system 105. The range limit is based on phase ambiguities, which occurs when the range of the target exceeds half the modulation wavelength. For example, a modulation frequency of 1 MHz has a range limit of about 150 meters. For the embodiment in which the detection units 145 and 150 comprise lock-in amplifiers, the phase uncertainty from lock-in detection is determined by the signal-to-noise ratio of the respective detection signal. Range resolution is determined by both the SNR and the modulation frequency in that increasing both provides finer resolution. However, increasing the modulation frequency reduces the range limit.

The target system 105 may employ various techniques to extend the range limit for a given modulation frequency. For example, the target system 105 may use an algorithm that unwraps the phase, which requires additional processing. In another example, the target system 105 may display two or more possible ranges for the target corresponding to different possible phases that are spaced 360 degrees apart. In this example, a human operator may guess which of the ranges is most likely the correct one, e.g., based on a visualization of the target and/or other information. In yet another example, the target system 105 may modulate the light source 120 with a reference signal having a varying frequency. In this example, the target system 105 may correlate the elastic scatter detection signal with a delayed version of the reference signal and adjust the delay of the reference signal until the correlation is maximized. This time delay corresponds to the flight time for the transmitted light beam 122 to travel to the target and the resulting elastic light scatter to travel back to the target system 105. The range of the target may then be determined based on the time delay and the speed of light. Other techniques may also be employed to extend the range limit of the target system 105.

Examples of taggant materials that may be used include semiconductor quantum dots with near infrared emission (e.g., indium arsenide (InAs) and lead sulfide (PbS)). InAs and PbS may absorb light throughout the ultraviolet (UV) and visible spectrum and may be engineered to emit light with wavelengths from 1.0 to 1.5 µm with a fluorescence lifetime $\tau_{fl}$ between 1 to 20 ns. Rare earth doped nanaocrystals, such as neodymium (Nd) doped vanadate, can be sensitized to absorb light in the UV spectrum and emit light at around 1.0 µm with a fluorescence lifetime $\tau_{fl}$ on the order of 100 s of microseconds. These two types of taggants can be easily discriminated against each other and background fluoresce based on lifetime information extracted by the target system 105.

In one embodiment, the computation unit 160 may store the fluorescence lifetimes for different types of taggants in memory. In this embodiment, when a target is marked (tagged) with a particular taggant, the taggant type may be entered into the computation unit 160 manually. Alternatively, the target system 105 may include an RF receiver 175 or other type of receiver that receives information about the taggant type from a remote device. For example, an individual at the remote device may communicate the taggant type to the target system 105 via a wireless link. In this embodiment, when the target system detects a taggant on a target, the computation unit 160 may compare the average lifetime of the detected taggant with the lifetime of the taggant type in memory to confirm that the target is marked with the taggant of interest.

As discussed above, the taggant material absorbs a portion of the light beam 122 and reemitts light at a different wavelength than the light beam 122. This allows the optical filter 130 to separate out the elastic light scatter and the fluorescent light using wavelength filtering. Although the examples of taggant materials discussed above reemitt light at longer wavelengths, taggant materials that reemitt light at shorter wavelengths may also be used. For example, an electron in a taggant material may absorb the energy of two or more photons of the light beam 122, allowing the electron to reemit a photon at a higher energy, and thus reemit light at a shorter wavelength.

Figure 2:
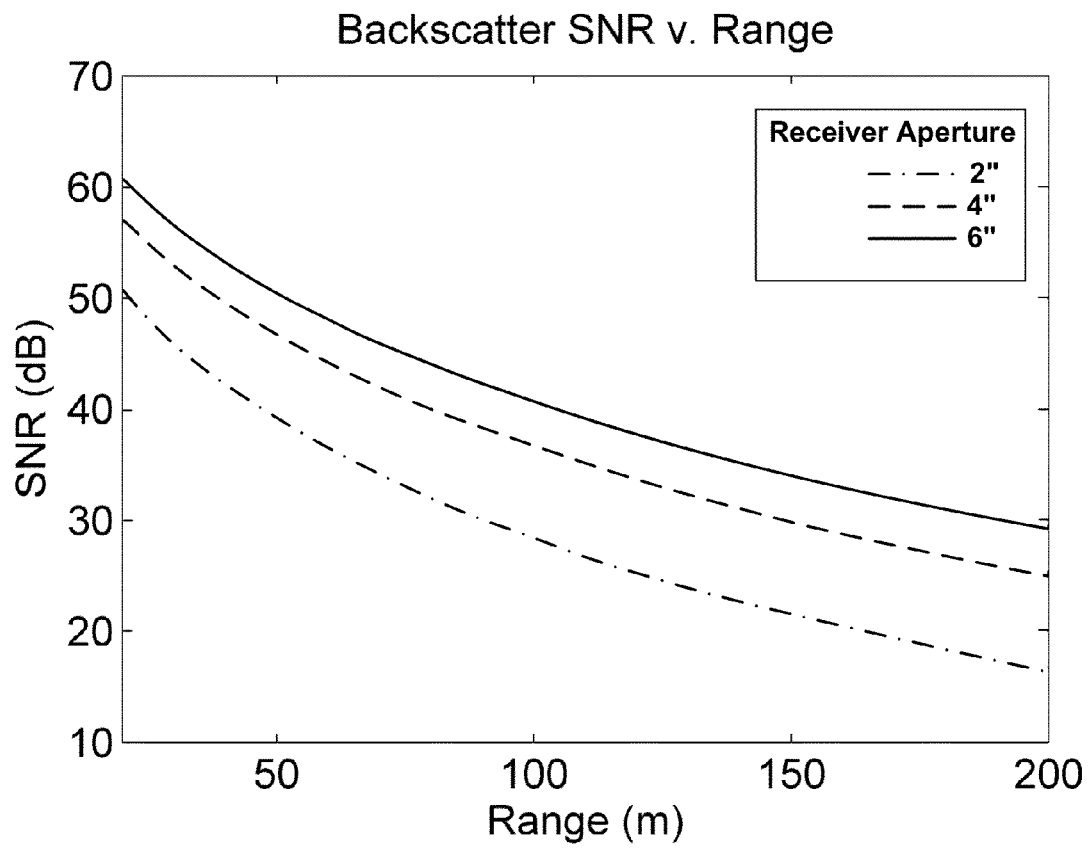
FIG. 2 shows an exemplary plot of signal-to-noise ratio (SNR) for an elastic scatter signal as a function of range according to an embodiment of the present invention.

FIG. 2 shows a plot of signal-to-noise ratio (SNR) for the elastic scatter signal as a function of range in a simulation. For the simulation, a 250 mW 405 nm laser diode was used for the light source, the light beam was held on the target for one millisecond, and a biased diode was used for the detector. Also, the reflectivity of the target was 8e-4 sr$^{-1}$, which approximates the reflectively of cloth that may be worn by an enemy combatant. Other simulation parameters are shown in FIG. 2. The plot in FIG. 2 shows that even a low reflectivity target can provide high SNR, which gives good range certainty. This demonstrates good elastic scatter sensitivity for the target system 105.

Figure 3:
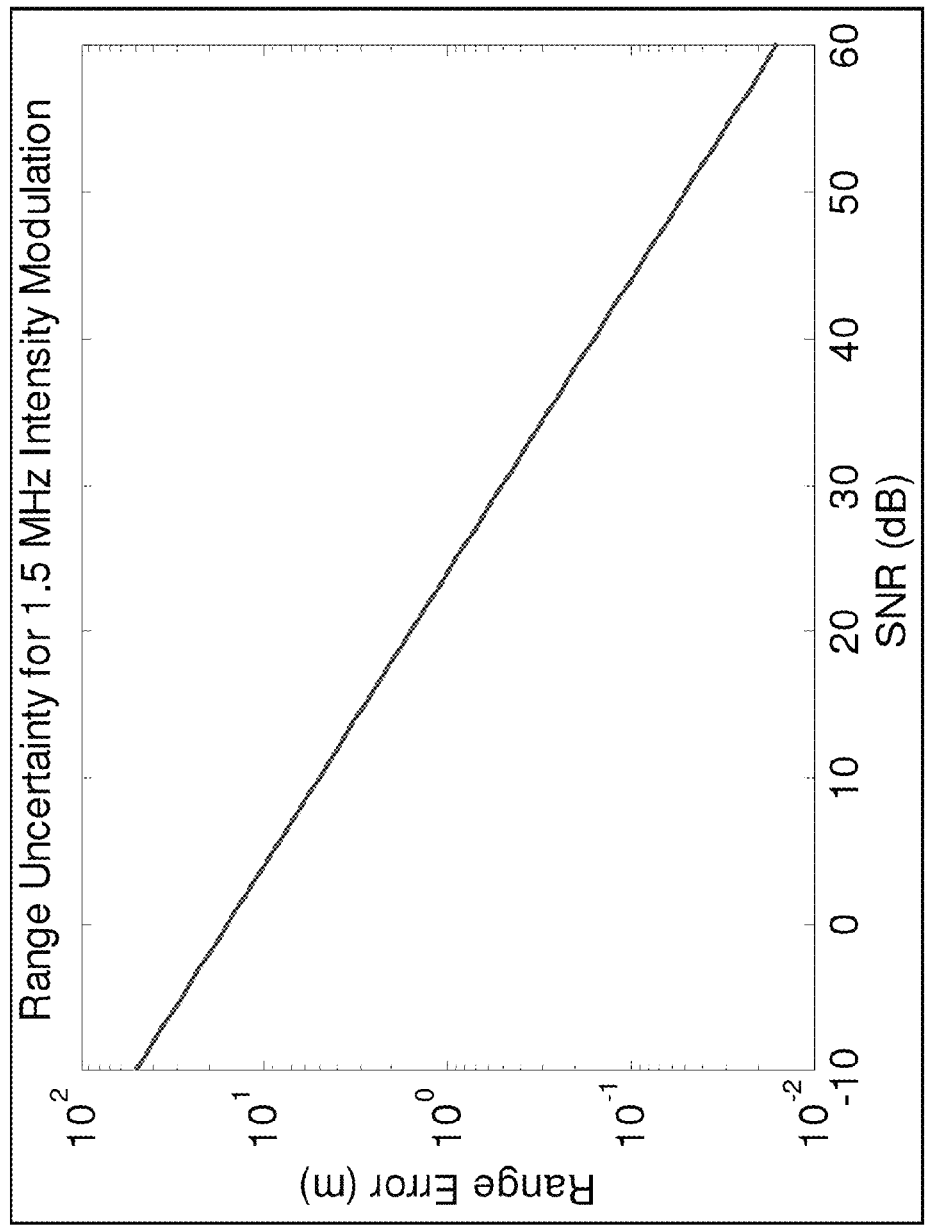
FIG. 3 shows an exemplary plot of range error as a function of SNR for the elastic scatter signal according to embodiment of the present invention.

FIG. 3 shows a plot of range error as a function of SNR for the elastic scatter signal in a simulation. The range uncertainty is given by the standard deviation of the extracted phase. For the simulation, the light source was intensity modulated at a frequency of 1.5 MHz and the fluorescence lifetime $\tau_{fl}$ of the taggant was about 5 ns. Other simulation parameters are shown in FIG. 3. The plot in FIG. 3 shows that, at a range of 200 meters, the range error can be less than one meter.

Figure 4:
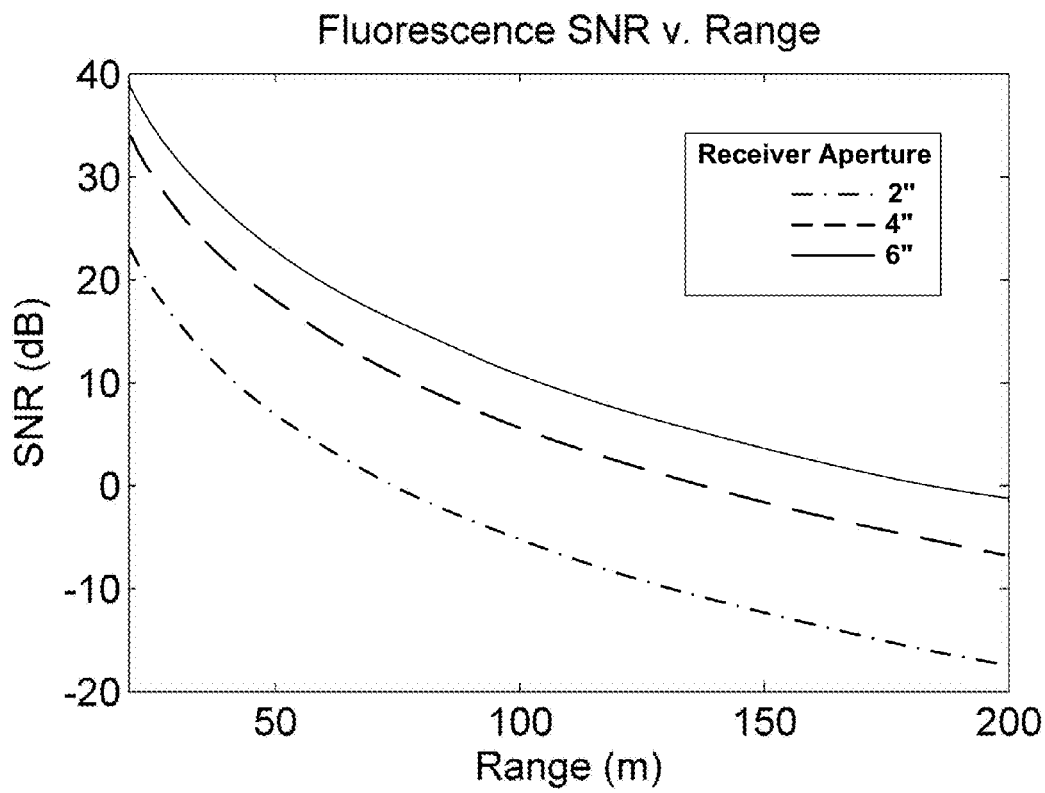
FIG. 4 shows an exemplary plot of SNR for a fluorescent signal as a function of range according to an embodiment of the present invention.

FIG. 4 shows a plot of signal-to-noise ratio (SNR) for the fluorescent signal as a function of range in a simulation. For the simulation, one gram of the taggant was dispersed uniformly 15 meters from the target. It was assumed that only 70 percent of the taggant stuck to the target. The light source was a low power 405 nm laser diode, and the detector was a low power InGaAs diode detector. Other simulation parameters are shown in FIG. 4. The plot in FIG. 4 shows good taggant sensitivity during daylight past a range of 100 m for 100 ms integration time.

The target system 105 according to various embodiments can provide numerous advantages over target systems based on other approaches.

In one approach, a pulsed laser with a high peak pulse power is used to excite the taggant and generate enough fluorescent photons for detection by a direct-detection lidar sensor. In this approach, ranging is done by time-of-flight detection of the elastic scattered signal or time-of-flight detection of the fluorescent signal. In order to achieve range resolution that is pulse duration limited, high bandwidth detectors and electronics must be used. Since noise is proportional to bandwidth, the high bandwidth electronics increase the noise in the measurement and decrease sensitivity. In this approach, sensitivity is gained by increasing the laser peak power, increasing the size of the collection optics, or increasing the averaging time. As a result, target systems using this approach are large (i.e., cannot be carried by an individual) and expensive. If taggant discrimination or confirmation is desired then the fluorescence spectrum is measured by dispersing the signal by diffraction and detecting the different wavelength components of the signal on a multi-pixel detector, such as a charge coupled device (CCD) camera. However, dispersing the signal greatly diminishes the sensitivity of the detector. Also multi-pixel detection using CCD cameras consume more power, are bigger, and are more expensive than single pixel detectors.

In contrast, the target system 105 according to various embodiments of the invention provides rich information extraction from tagged targets in a package that is relatively inexpensive and can be easily carried and operated by an individual. For example, the light source 120 may comprise an inexpensive low power cw laser (e.g., 250 mW laser diode), which is much cheaper than the pulsed light sources used in the approach discussed above. A cw laser is also safer because it does not have the high peak powers of a pulsed source. In addition, the cw laser eliminates timing issues and electronics needed for detection of the pulsed source and return signal. This reduces the amount of electronics needed for the target system 105, and hence the size of the target system 105. Thus, the cw light source used in the target system 105 provides the following advantages: inexpensive relative to pulsed light sources, eliminates timing considerations associated with a pulsed light source, and is safer to use because of lower peak powers.

For the embodiment in which the target system 105 comprises lock-in amplifiers, sensitivity is based on lock-in detection, which can extract signals from >100 dB of noise. Lock-in detection does not require the timing electronics of a pulsed system, and the reference signal for the lock-in detection can be electronic or optical.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A target system, comprising:
   a light source configured to generate a light beam, wherein an intensity of the light beam is modulated at a modulation frequency;
   front-end optics configured to direct the light beam to a target;
   an optical filter configured to receive return light from the target, and to separate out elastic light scatter and fluorescent light in the return light, the elastic light scatter in the return light having a different phase than the light beam;
   a first photodetector configured to receive the elastic light scatter from the optical filter, and to generate an elastic scatter detection signal based on the received elastic light scatter;
   a second photodetector configured to receive the fluorescent light from the optical filter, and to generate a fluorescent detection signal based on the received fluorescent light; and a detection and computation subsystem configured to compute a phase difference between the elastic scatter and fluorescent detection signals, and to determine a fluorescence lifetime based on the phase difference.

2. The target system of claim 1, wherein the detection and computation subsystem is configured to compare the determined fluorescence lifetime with a known fluorescence lifetime of a taggant, and to determine whether the target is marked with the taggant based on the comparison.

3. The target system of claim 1, wherein the detection and computation subsystem is configured to compute an amplitude of the fluorescent detection signal, and to determine whether a taggant is present based on the amplitude of the fluorescent detection signal.

4. The target system of claim 1, wherein the detection and computation subsystem is configured to compute a phase difference between the elastic scatter detection signal and a reference signal, and to determine a range of the target from the target system based on the phase difference between the elastic scatter detection signal and the reference signal.

5. The target system of claim 4, wherein a phase of the reference signal is synchronized with a phase of the light beam at an output of the light source.

6. The target system of claim 4, wherein the detection and computation subsystem further comprises a lock-in amplifier configured to compute the phase difference between the elastic scatter detection signal and the reference signal.

7. The target system of claim 1, wherein the detection and computation subsystem is configured to compute an amplitude of the elastic scatter detection signal, and to determine whether the target is present based on the amplitude of the elastic scatter detection signal.

8. The target system of claim 1, wherein the light source comprises a continuous wave laser.

9. The target system of claim 1, wherein the light beam is intensity modulated with a sine wave.

10. The target system of claim 1, wherein the detection and computation subsystem further comprises:
   a first lock-in amplifier configured to compute a phase difference between the elastic scatter detection signal and a reference signal;
   a second lock-in amplifier configured to compute a phase difference between the fluorescent detection signal and the reference signal; and
   a computation unit configured to compute the phase difference between the elastic scatter and fluorescent detection signals based on the phase differences from the first and second lock-in amplifiers.

11. A method for target detection, comprising:
   directing a light beam to the target, wherein the light beam is generated by a light source and an intensity of the light beam is modulated at a modulation frequency;
   receiving return light from the target;
   separating out elastic light scatter and fluorescent light in the return light, the elastic light scatter in the return light having a different phase than the light beam;
   generating an elastic scatter detection signal based on the elastic light scatter;
   generating a fluorescent detection signal based on the fluorescent light;
   computing a phase difference between the elastic scatter and fluorescent detection signals; and
   determining, by a computation unit, a fluorescence lifetime based on the phase difference.

12. The method of claim 11, further comprising:
   comparing the determined fluorescence lifetime with a known fluorescence lifetime of a taggant; and
   determining whether the target is marked with the taggant based on the comparison.

13. The method of claim 11, further comprising:
   computing an amplitude of the fluorescent detection signal; and
   determining whether a taggant is present based on the amplitude of the fluorescent detection signal.

14. The method of claim 11, further comprising:
   computing a phase difference between the elastic scatter detection signal and a reference signal; and
   determining a range of the target from the target system based on the phase difference between the elastic scatter detection signal and the reference signal.

15. The method of claim 11, further comprising:
   computing an amplitude of the elastic scatter detection signal; and
   determining whether the target is present based on the amplitude of the elastic scatter detection signal.

16. The method of claim 11, wherein the light beam is generated by a continuous wave laser.

17. The method of claim 11, wherein the light beam is intensity modulated with a sine wave.

* * * * *